United States Patent
Witkowsky et al.

(10) Patent No.: US 10,598,816 B2
(45) Date of Patent: Mar. 24, 2020

(54) SYSTEMS AND METHODS FOR RELATIVE DIP CORRECTION

(71) Applicant: Halliburton Energy Services, Inc., Houston, TX (US)

(72) Inventors: James Michael Witkowsky, Houston, TX (US); John Andrew Quirein, Georgetown, TX (US); Yi Zhou, Sugar Land, TX (US); Ferhat Turker Celepcikay, Ankara (TR); Luis Emilio San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 578 days.

(21) Appl. No.: 15/030,979

(22) PCT Filed: Jan. 3, 2014

(86) PCT No.: PCT/US2014/010207
§ 371 (c)(1),
(2) Date: Apr. 21, 2016

(87) PCT Pub. No.: WO2015/102640
PCT Pub. Date: Jul. 9, 2015

(65) Prior Publication Data
US 2017/0038495 A1    Feb. 9, 2017

(51) Int. Cl.
*E21B 47/09*    (2012.01)
*G01V 13/00*    (2006.01)
(Continued)

(52) U.S. Cl.
CPC .............. *G01V 13/00* (2013.01); *E21B 47/09* (2013.01); *E21B 47/122* (2013.01); *G01V 3/28* (2013.01); *E21B 47/022* (2013.01)

(58) Field of Classification Search
CPC .......... G05B 17/02; G01V 3/10; G01V 13/00; G01V 3/28; E21B 7/04; E21B 47/122; E21B 47/09; E21B 47/022
See application file for complete search history.

(56) References Cited

U.S. PATENT DOCUMENTS

| 5,184,079 A | 2/1993 | Barber |
| 6,591,195 B2 * | 7/2003 | Haugland ................ G01V 3/28 324/338 |

(Continued)

FOREIGN PATENT DOCUMENTS

WO    WO-2015102640 A1    7/2015

OTHER PUBLICATIONS

Dip correction. (Mar. 8, 2013). Retrieved Oct. 9, 2018, from https://www.glossary.oilfield.slb.com/en/Terms/d/dip_correction.aspx Publish date verified by Waybackmachine.com.*

(Continued)

*Primary Examiner* — Jarrett J Stark
(74) *Attorney, Agent, or Firm* — Gilliam IP PLLC

(57) ABSTRACT

Disclosed embodiments include systems and methods of correcting induction logging data for relative dip. Initial induction logging data is measured at a plurality of frequencies. One example embodiment includes displaying dip corrected data for a plurality of different relative dip angles, which may further be displayed with a qualitative indicator displayed over many depth samples for selecting or validating a correct relative dip angle. The data may be iteratively processed using an automated relative dip correction algorithm and analyzed by the user to obtain and apply the best relative dip correction angle to induction logging data. Once dip corrected, the induction logging data can be used with resistivity methodologies generally designed for instances where no dip is present in the formation under analysis.

18 Claims, 11 Drawing Sheets

(51) Int. Cl.
*E21B 47/12* (2012.01)
*G01V 3/28* (2006.01)
*E21B 47/022* (2012.01)

(56) References Cited

U.S. PATENT DOCUMENTS

| | | | | |
|---|---|---|---|---|
| 8,941,383 | B2* | 1/2015 | Hopper | E21B 47/082 |
| | | | | 324/309 |
| 2003/0028324 | A1 | 2/2003 | Xiao et al. | |
| 2003/0075361 | A1* | 4/2003 | Terry | G01V 3/30 |
| | | | | 175/61 |
| 2003/0076107 | A1* | 4/2003 | Fanini | G01V 3/28 |
| | | | | 324/339 |
| 2006/0256656 | A1* | 11/2006 | Sinha | G01V 1/50 |
| | | | | 367/31 |
| 2007/0236221 | A1 | 10/2007 | Merchant et al. | |
| 2007/0239378 | A1 | 10/2007 | Rabinovich et al. | |
| 2007/0257679 | A1* | 11/2007 | Fanini | G01V 3/28 |
| | | | | 324/366 |
| 2008/0033654 | A1 | 2/2008 | Bespalov et al. | |
| 2008/0224705 | A1* | 9/2008 | Simon | G01V 3/30 |
| | | | | 324/333 |
| 2010/0109672 | A1* | 5/2010 | Rabinovich | G01V 3/28 |
| | | | | 324/338 |
| 2011/0181277 | A1* | 7/2011 | Korb | G01N 24/08 |
| | | | | 324/303 |
| 2015/0032375 | A1* | 1/2015 | Bertrand | G01V 13/00 |
| | | | | 702/7 |
| 2016/0018553 | A1* | 1/2016 | Celepcikay | G01V 3/38 |
| | | | | 324/339 |
| 2016/0282503 | A1* | 9/2016 | Hou | G01V 3/38 |
| 2016/0291195 | A1* | 10/2016 | Wu | G01V 3/38 |
| 2017/0248013 | A1* | 8/2017 | Yang | G01V 3/30 |

OTHER PUBLICATIONS

"International Application Serial No. PCT/US2014/010207, International Search Report dated Oct. 13, 2014", 4 pgs.

"International Application Serial No. PCT/US2014/010207, Written Opinion dated Oct. 13, 2014", 8 pgs.

\* cited by examiner

SYSTEMS AND METHODS FOR RELATIVE DIP CORRECTION

PRIORITY APPLICATIONS

This application is a U.S. National Stage Filing under 35 U.S.C. 371 from International Application No. PCT/US2014/010207, filed on Jan. 3, 2014, and published as WO 2015/102640 A1 on Jul. 9, 2015, which application and published are incorporated herein by reference in their entirety.

BACKGROUND

The present disclosure relates generally to systems and methods for correcting dip measurements, and more particularly relates to systems and methods for interpreting for relative dip angles of formations or deviated wellbores utilizing vertical resistivity evaluation techniques.

The production of hydrocarbons from subsurface formations typically commences by forming a borehole into the earth to a subsurface reservoir thought to contain hydrocarbons. Tools may be deployed in the borehole to measure various physical, chemical, and mechanical properties of the formation, including for example, the porosity, permeability, saturation, and depth, of the subsurface formations encountered. This measurement includes induction logging to measure the conductivity or its inverse, the resistivity, of a formation by employing alternating currents to set up an alternating magnetic field in the surrounding conductive formation. This changing magnetic field induces detectable current loops in the formation.

Generally, a transmitter transmits an electromagnetic signal that passes through formation materials around the borehole and induces a signal in one or more receivers. The properties of the signal received, such as its amplitude and/or phase, are influenced by the formation resistivity, enabling resistivity measurements to be made. The measured signal characteristics and/or formation properties calculated therefrom may be recorded as a function of the tool's depth or position in the borehole, yielding a formation log that can be used to analyze the formation.

In vertical boreholes with little or no relative dip angle, a signal and response may be concentrated in a single formation layer. When the borehole is deviated, or when a bed exhibits relative dip with respect to the primary axis of the borehole, the signal and response may propagate through multiple layers and across multiple boundaries, resulting in a relative dip angle log that blends adjacent layers, and hence, a resistivity measurement that is a blending of the adjacent layers. In many cases, the effect of such a relative dip on the induction log is to make beds appear thicker, create separation of different sensor arrays and/or create gradual changes near the boundaries. It is known that thin beds are more affected by relative dip than thick beds, and resistive beds are more affected by relative dip than conductive beds.

Relative dip correction algorithms for array induction data have been implemented to remove the effects of relative dip in the response of the array induction logging tools. In such algorithms, removing the effect of the relative dip means that a log that is equivalent to what would be obtained if the well path was adjusted to be normal to the boundaries is achieved. However, current methods for automated relative dip corrections may result in results that are not always correct, especially in formations with interspersed thin beds or invasion, which may not be accurately accounted for by automated relative dip correction algorithms. A means for interpreting for or confirming the outputs from automated relative dip correction algorithms for array induction measurements allows for improved relative dip corrects and portrayals of invasion profiles.

DETAILED DESCRIPTION

The following detailed description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those skilled in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present disclosure includes a variety of combinations and/or integrations of the embodiments and examples described herein, as well as further embodiments and examples as defined within the scope of all claims based on this disclosure, as well as all legal equivalents of such claims.

This disclosure describes systems and methods for correcting induction logging data for relative dip. One example embodiment includes displaying dip corrected data for a plurality of different relative dip angles, which may further be displayed with a qualitative indicator displayed over many depth samples for selecting or validating a correct relative dip angle. The data may be iteratively processed using an automated relative dip correction algorithm and analyzed by the user to obtain and apply the best relative dip correction angle to induction logging data. Once dip corrected, the induction logging data can be used with standard resistivity processing methodologies.

Figure 1B:
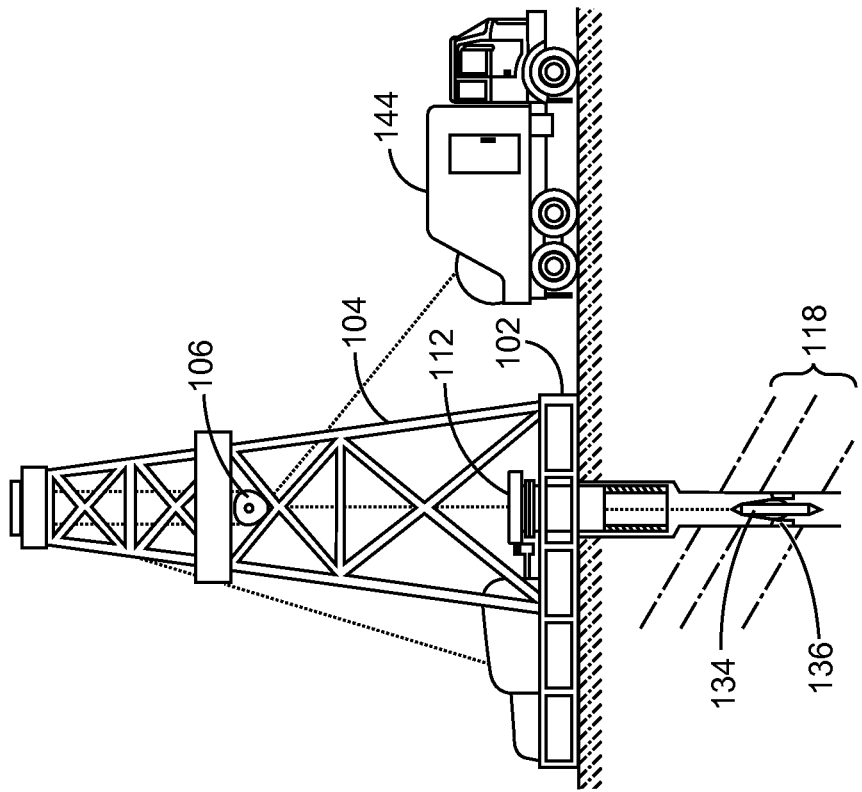
FIGS. 1A-1B depict schematic views of a system using relative dip corrections.
Figure 1A:
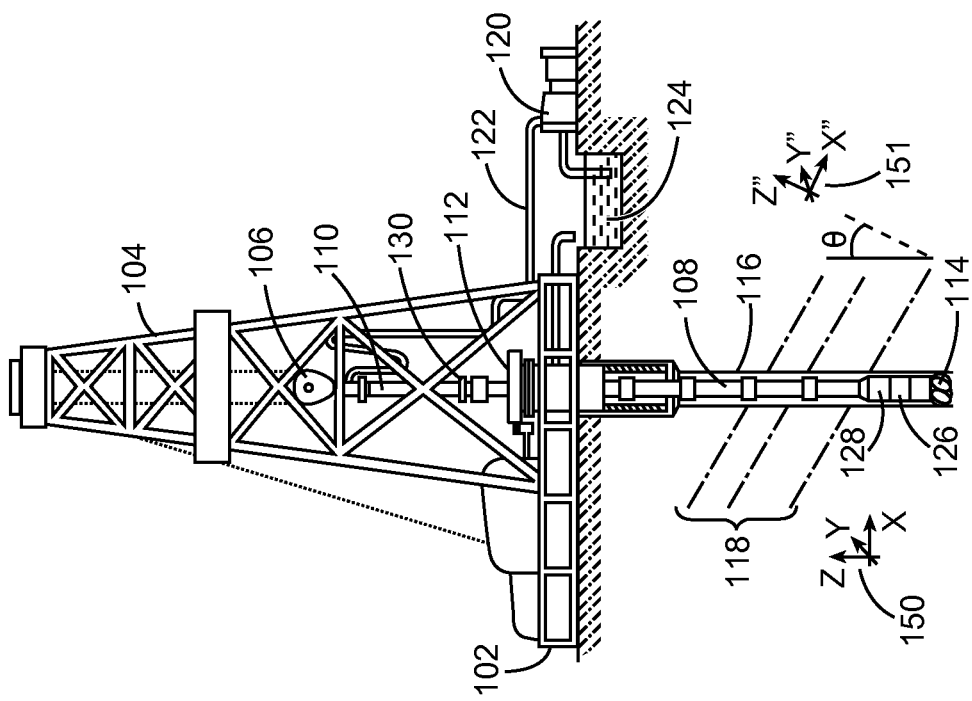

FIG. 1A depicts an example logging while drilling (LWD) environment, wherein a drilling platform 102 supports a derrick 104 having a traveling block 106 for raising and lowering a drill string 108. A kelly 110 supports the drill string 108 as it is lowered through a rotary table 112. A drill bit 114 is driven by a downhole motor and/or rotation of the drill string 108. As bit 114 rotates, it creates a borehole 116 that passes through various formations 118. A pump 120 will typically circulate drilling fluid (or other well fluids) through a feed pipe 122 to kelly 110, downhole through the interior of drill string 108, through orifices in drill bit 114, back to the surface via the annulus around drill string 108, and into a retention pit 124. The drilling fluid transports cuttings from the borehole into the pit 124 and aids in maintaining the borehole integrity.

An induction logging tool 126 may be integrated into the bottom-hole assembly near the bit 114. As the bit extends the borehole through the formations, the induction logging tool 126 collects measurements relating to various formation properties as well as the tool orientation and position and various other drilling conditions. The induction logging tool 126 may take the form of a drill collar, i.e., a thick-walled tubular that provides weight and rigidity to aid the drilling process. A telemetry sub 128 may be included to transfer tool measurements to a surface receiver 130 and to receive commands from the surface receiver 130. At various times during the drilling process, the drill string 108 may be removed from the borehole as shown in FIG. 1B. Once the drill string 108 has been removed, logging operations can be conducted using a wireline logging tool 134 (e.g., a sensing instrument sonde) suspended by a cable having conductors for transporting power to the tool and telemetry from the tool to the surface. A resistivity imaging portion of the logging tool 134 may have centralizing arms 136 that center the tool within the borehole 116 as the tool is pulled uphole. A logging facility 144 may collect measurements from the logging tool 134, and may include computing facilities for processing and storing the measurements gathered by the logging tool.

Figure 2:
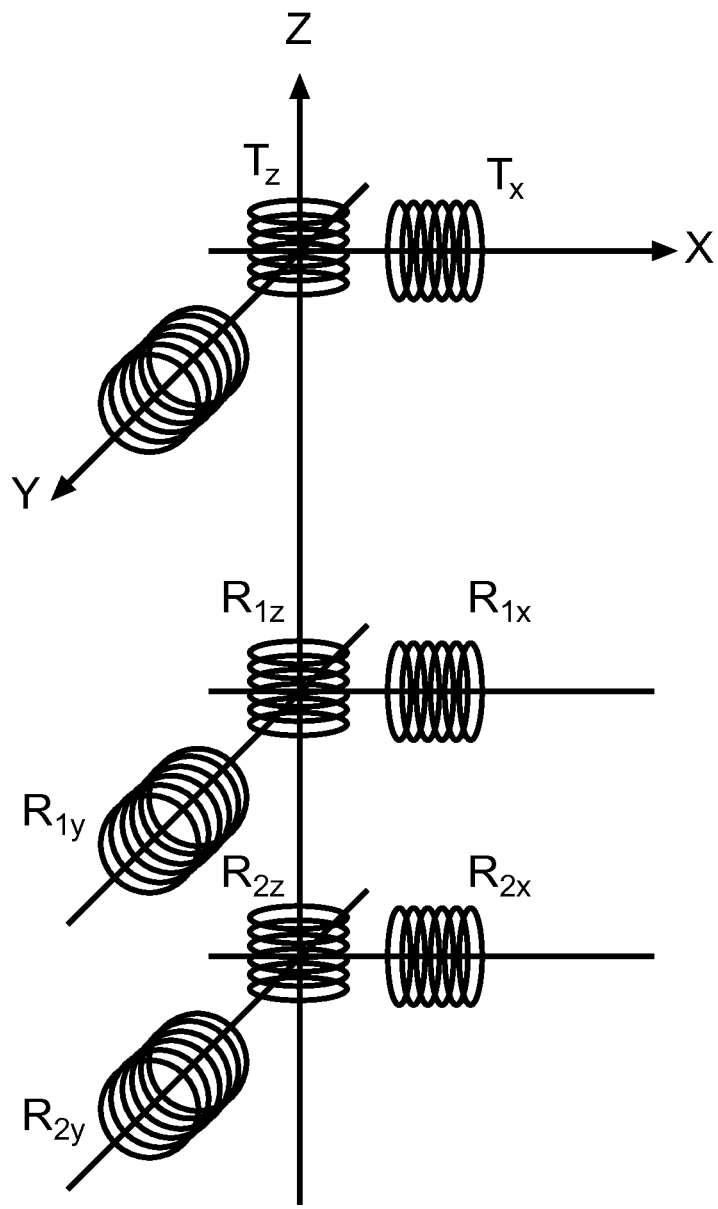
FIG. 2 illustrates a hypothetical antenna configuration for an example multi-component electromagnetic resistivity logging tool.

FIG. 2 shows a hypothetical antenna configuration for an example multi-component electromagnetic resistivity logging tool which may be embodied as a wireline tool or as a logging while drilling tool. In this example configuration, a triad of transmitter coils $T_X$, $T_Y$, and $T_Z$, are provided, with each oriented along a respective X, Y, or Z axis. At least one triad of similarly oriented receiver coils $R_{1X}$, $R_{1Y}$, and $R_{1Z}$ is also provided, again with each oriented along a respective X, Y, or Z axis. For received signal measurements relative to the amplitude and phase of the transmitted signal (sometimes called "absolute" measurements) only one receiver triad would be used. A second triad of similarly oriented receiver coils pairs $R_{2X}$, $R_{2Y}$, and $R_{2Z}$ is also provided when differential measurements are desired (e.g., for example, a signal amplitude ratio or a phase difference between receiver coils oriented along a given axis).

Referring again to FIGS. 1A-1B, the logging tools disposed in borehole 116 are positioned by formations 118 having a plurality of layers which form an angle θ with the borehole's long axis (z-axis). The borehole may have a Cartesian coordinate system 150 defined in accordance with the borehole's long axis (the z-axis) and the north side (or alternatively, the high side) of the hole (the x-axis). The formations 118, when characterized as a plane, may have a Cartesian coordinate system 151 defined in accordance with the normal to the plane (the z"-axis) and the direction of steepest descent (the x"-axis).

Borehole 116 is often not perpendicular to formations 118, which occurs naturally or due to directional drilling operations. Angle θ represents the relative dip angle between the logging tools and the layers of formation. Relative dip angle θ refers to the angle between a line (pole) normal to the bedding plane and the long axis of the borehole, measured in their common plane. Dip refers to the angle of slope of an inclined bed measured perpendicular to the strike and in the vertical plane, referenced to the horizontal plane. Strike refers to the direction of a line formed by the intersection of the surface of the inclined bed with the horizontal plane. The vertical resistivity is generally found to be the resistivity as measured perpendicular to the plane of the formation, and the horizontal resistivity is the resistivity as measured within the plane of the formation. Determination of these parameters (relative dip angle, dip, strike angle, vertical resistivity, and horizontal resistivity) is desirable.

Figure 3:
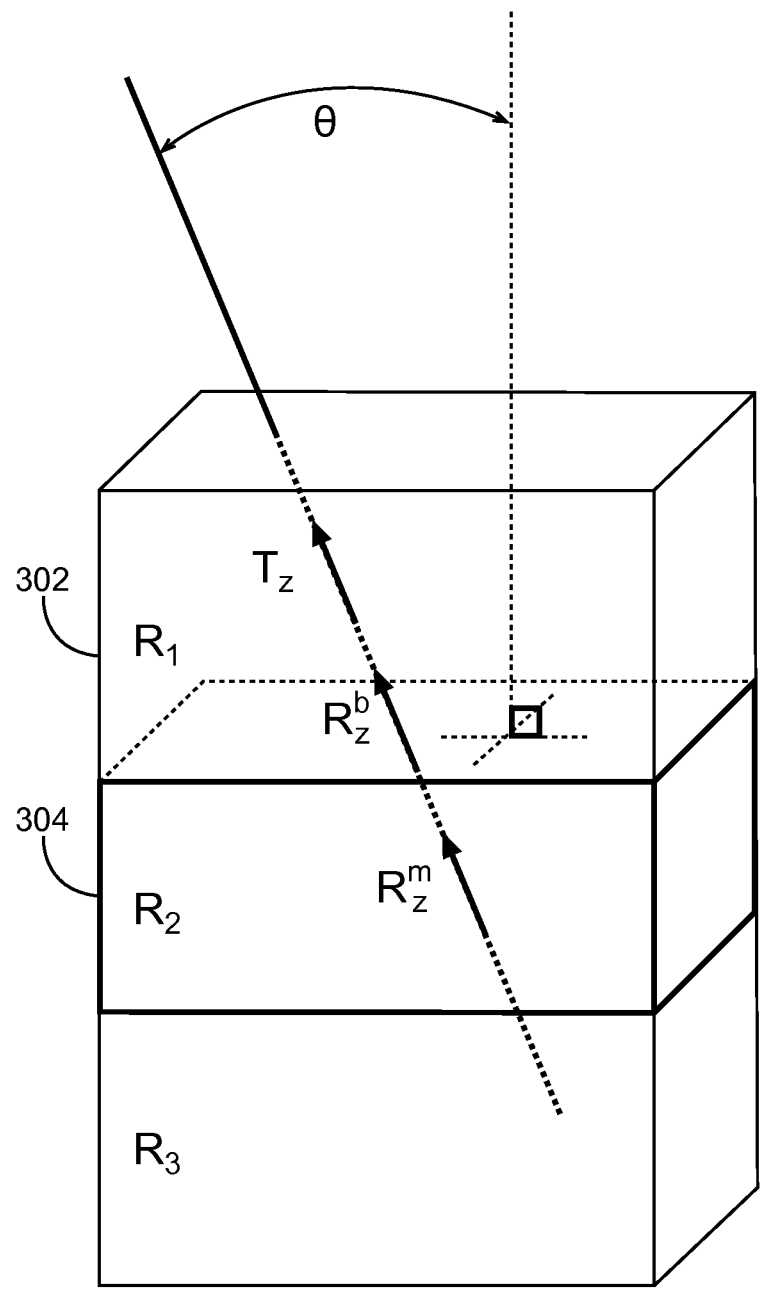
FIG. 3 illustrates two different horizontal formation layers that are intersected by a deviated borehole, which causes relative dip effects.

In an embodiment, signals from logging tools are processed to probe the formation 118 surrounding the borehole 116, resulting in a multi-array induction log. It is desirable to correct induction logging data to remove signals that can affect quality of the results of the logging data, particularly in deviated boreholes or dipping formations. For example, the relative dip angle can perturb measured resistivity. As illustrated in FIG. 3, two different horizontal formation layers (e.g., 302 and 304) are intersected by a deviated borehole 306 at a relative dip angle of θ. Receivers $R_z^b$ and $R_z^m$ reside in separate formation layers having distinct formation resistivity (e.g., $R_1$ and $R_2$). Depending upon the logging tool measurement point and distance between receivers, the resistivity provided by the logging tool is a combination of both formation's resistivities. Thus, it is desirable to remove at least four different effects from the induction logging data: 1) skin effect (due to conductive losses arising from the formation), 2) borehole effect (due to presence of a resistive or conductive mud around the logging tool in the borehole), 3) shoulder bed effect (due to influence of layer boundaries on the propagated signal) and 4) dip effect.

Dip effect has a significant impact on measured resistivity ($R_a$) when compared to formation resistivity ($R_t$) for various depths of investigation. With respect to dip effect, there are two types of relative dip effect. The first dip effect, which is referred to as "type I relative dip effect," is associated with a sampling mismatch (e.g., mismatch in the distance between samples) in the standard processing caused by dip. Type 1 relative dip effect occurs due to an assumption by the standard array induction processing of a vertical borehole with True Vertical Depth (TVD) step size. However, the relative dip angle effects the TVD utilized during processing, wherein the TVD distance between two adjacent measurement points is step size multiplied by cos(θ). As one example, this would be 0.25*cos(θ), where θ is relative dip angle and 0.25 feet is the measured depth step size. Therefore, for θ=75°, the TVD distance between two adjacent measurement points in the example becomes 0.0647 ft. Thus, type I relative dip effect is more an algorithm error than a physical effect. This type of dip effect can be corrected by using interpolation to generate a sequence of data points separated by an adjusted TVD.

The second type of dip effect, which is referred to as "type II relative dip effect," is the physical dip effect caused by increased shoulder effect and bed boundary effects associated with dip. To remove type II relative dip effect, an algorithm based on numerical inversion is utilized. The algorithm uses borehole corrected and skin effect corrected data in a 1D vertical inversion (V1D) scheme that relies on a 1D fast analytic forward modeling. Once the layers of the V1D inversion are found, the type II relative dip effect is evaluated synthetically and removed from the induction logs.

Figure 4:
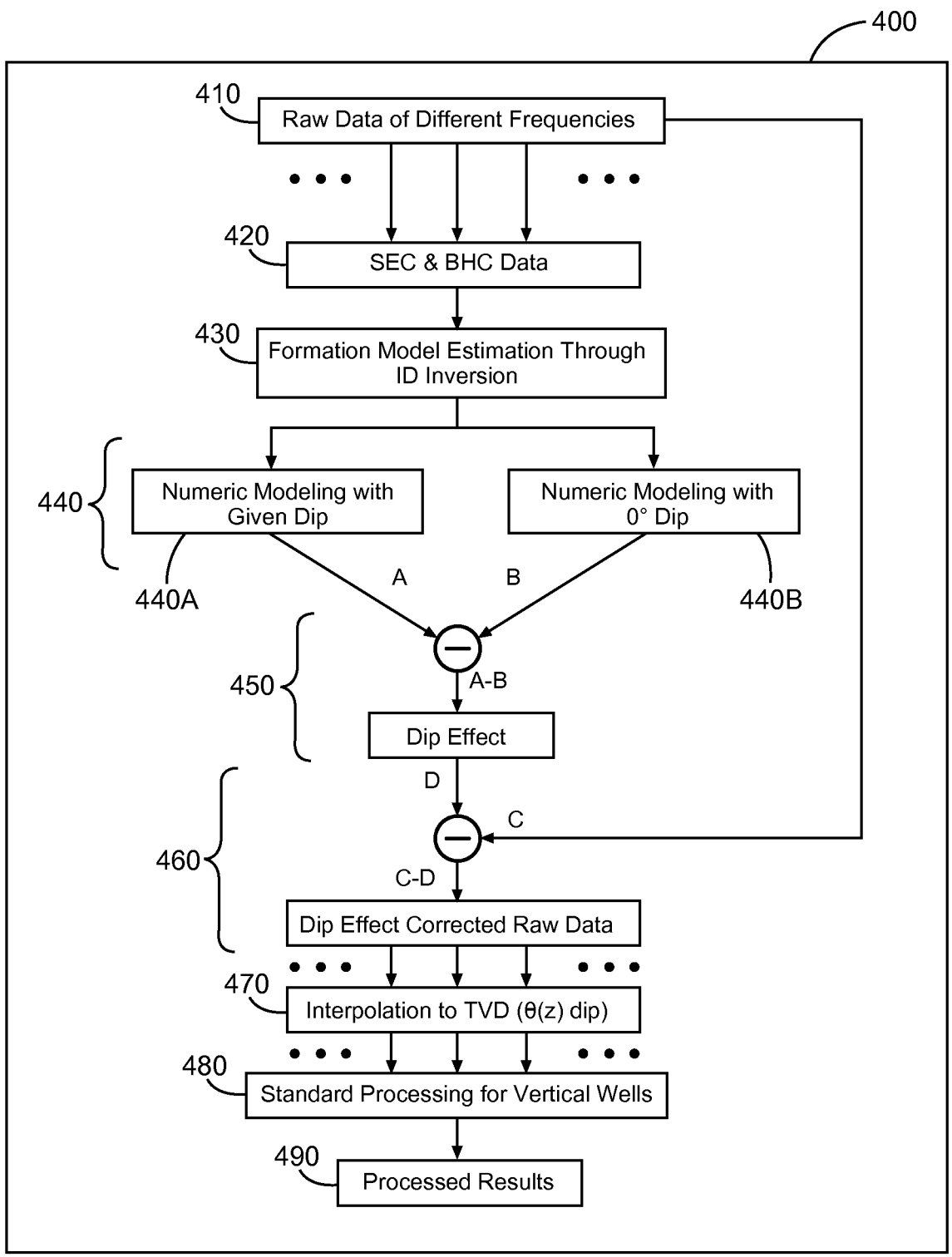
FIG. 4 illustrates a flow diagram of an automated dip correction algorithm.

FIG. 4 illustrates a flow diagram of an example automated dip correction algorithm 400. As an overview, the dip correction algorithm comprises a skin effect correction (SEC) and borehole effect correction (BHC) data module, a 1D inversion module, and a standard zero degree or no dip conductivity module. Dip correction algorithm 400 first executes the SEC and BHC data module, and then introduces the results to the 1D inversion module to correct the data for dip, and finally, processes the dip corrected data using standard conductivity analysis that is configured for zero dip, as described in more detail below.

In step 410, an induction logging tool is utilized to collect raw data. The raw data is representative of an array of receivers spaced along the induction logging tool. The raw data collected in step 410 consists of real and imaginary signals obtained at a multitude of frequencies, arrays and depths. The raw data is preferably collected over a range of frequencies, but at least at two different frequencies. Although not intended as a limitation, in certain preferred embodiments, frequencies typically range from 5 KHz to 250 KHz. In certain embodiments, as an optional intermediate step (not shown), the raw data of step 410 may be corrected for calibration and temperature, before other processing steps, to yield the initial induction logging data with raw data.

In step 420, the raw data is corrected for skin effect and borehole effect, resulting in SEC and BHC data. In certain embodiments, corrections for skin effect and borehole effect are separately processed. By separately correcting for each of these effects, the corrections can be limited to analysis in one primary direction of correction, eliminating the need for analysis of higher order interactions that result between different effects when collectively analyzed. In other words, these higher order interactions can be eliminated from analysis by separately addressing different effects.

The removal of skin effect, in some embodiments, combines multiple frequency data from each array in the logging tool. The combination of the multiple frequency data, which can be referred as multi-frequency processing, allows for removal of the skin effect, and improves the robustness of a subsequent dip correction. Multi-frequency processing is defined as a processing which has results that are sensitive to data from more than one frequency. It has been found that the skin effect can make numerical inversion (step 430) difficult to solve due to low signal level or uniqueness problems, especially when the logging tool is located in a zone of high conductivity. The use of multiple frequencies mitigates this problem because different frequencies are affected in different ways (e.g., low frequencies are less affected by skin effect). In many embodiments, higher frequencies are desirable in relatively higher resistivity environments, because in those environments, higher frequencies are associated with higher signal to noise ratios. By combining multiple frequency data in certain embodiments of step 420, the robustness of the subsequent inversion is improved. Additionally, by using the multiple frequency data, the reliability of the overall dip correction method can be improved, because by monitoring the integrity of the different frequencies, poor quality frequency data can be removed from the process and acceptable results can still be obtained with a reduced number of frequencies. Output of the skin effect correction data has its frequency dimension removed and hence has one less dimension compared to the input data. Typically, SEC data is a function of array and depth.

The removal of borehole effect is carried out in a manner well known in the field. In an embodiment, inversion with a concentric 2-layer model is conducted either by utilizing a look-up table or an iterative method with either known or unknown borehole diameter and mud resistivity. The look-up table is based on the range of possible mud resistivities, formation resistivities and borehole diameters. Output of the borehole correction data typically has the same dimensions as the input data.

In step 430, following skin effect correction and borehole effect correction, type II relative dip effect correction is applied. Specifically, a 1D inversion using the SEC and BHC data is performed to model the formation. 1D inversion is an optimization problem where real and/or imaginary results from a 1D model are compared to optimally match to real and/or imaginary measurement results. The output of the inversion is a set of layer resistivities and layer positions that are used as input parameters to the 1D model. As used herein, "1D model" denotes use of an algorithm that produces simulated signal response of the tool for a given 1D resistivity model. Here "1D resistivity model" refers to the single direction in which the resistivity of a model is varying. For example, a 1D model is a model where the layers are planar and parallel to each other. The dimensions are traditionally considered to be in the cylindrical domain, since a borehole is locally and approximately cylindrical. As a result, it is possible to consider resistivity variations in multiple directions which yield different algorithms. For example, a variation in vertical direction can be called vertical 1D (V1D).

As another example, a variation in the radial direction can be called radial 1D (R1D). It is possible to consider 2D and 3D inversions, or 2D and 3D models as a straightforward extension of the definitions above. A definition of "0D" can also be made similarly by considering a single layer (non-varying) homogeneous resistivity model. To the extent SEC data has been corrected utilizing combined frequencies, step 430 likewise is performed on the combined frequency results from each array and a depth range. The depth range is chosen large enough to cover the layers whose properties are being inverted along with any other layer that may affect the inversion of those layers. The depth range is chosen small enough to minimize number of layers in the 1D model and associated computational cost.

In step 440, after the inverted formation parameters such as layer resistivities and layer positions have been found, the effect of relative dip on the logs is computed for each array by modeling with the inverted formation parameters. The model in step 440 is chosen as vertical 1D for efficiency in computation. However, in alternative embodiments, both vertical and radial layers may be incorporated, making the modeling 2D or 3D. As shown, in step 440A, forward modeling is performed utilizing a given relative dip angle, while in step 440B, forward modeling is performed utilizing a zero degree (0°) relative dip.

In step 450, utilizing the results of steps 440A and 440B, the dip effect correction for type II is determined. In step 460, the raw data from step 410 is corrected utilizing the type II relative dip effect determined in step 450, and thereby yielding type II relative dip effect corrected data. In the methodology described above, θ=0° relative dip is taken as the reference, which means that the results with the relative dip is corrected to obtain results equivalent to those that would be obtained in the θ=0° relative dip case. However, it should be noted that any relative dip other than θ=0° can also be used as reference. In such case, however, all θ=0° relative dips in the models need to be replaced by the desired reference dip.

In one embodiment of steps 450 and 460, as illustrated in FIG. 4, the dip effect correction is evaluated as an additive factor. In such case the results of steps 440A and 440B are subtracted from one another to determine the dip effect. In another embodiment of steps 450 and 460, the dip effect correction is treated as a multiplicative correction factor, where the results of steps 440A and 440B are multiplied or divided to determine the dip effect correction utilizing a ratio. For example, the following multiplicative correction factor may be applied: (B/A×C), where A is the result of step 440A, B is the result of step 440B, and C is the raw data.

In step 470, the type II relative dip effect corrected data is interpolated to correct for type I relative dip effect as described above. An appropriate step size is selected and utilized in conjunction with a selected dip angle θ to yield a TVD adjusted for dip angle. In other words, the raw data of step 410 has been corrected to remove the effects of relative dip on the raw data so that the raw data can be treated as if it were acquired in a formation of zero relative dip (or from a non-deviated borehole). Although, in FIG. 4, type I relative dip effect correction is performed after type II relative dip effect correction, persons of ordinary skill in the art will understand that type I relative dip effect correction can be performed prior to type II relative dip effect correction.

In step 480, data that has been corrected for both type I and type II relative dip effects is utilized with standard processing techniques designed for wells with no relative dip, which are typically vertical wells. The resulting dip effect corrected data can be used with any standard no relative dip well processing methods for non-dipping formation logs. The standard processing methods produces focused resistivities which are regulated in vertical resolution and depth of investigation.

Further, inverted formation parameters, which are the output of the 1D inversion process 430, can be visualized (by graphically presenting, such as on a display or an output device for quality control. Similarly, the inverted formation parameters can be further processed by a radial inversion algorithm to generate an invasion profile or to generate different depth of investigation curves. These curves can then be graphically presented in order to compare the curves to standard processing curves for additional quality control.

Figure 5:
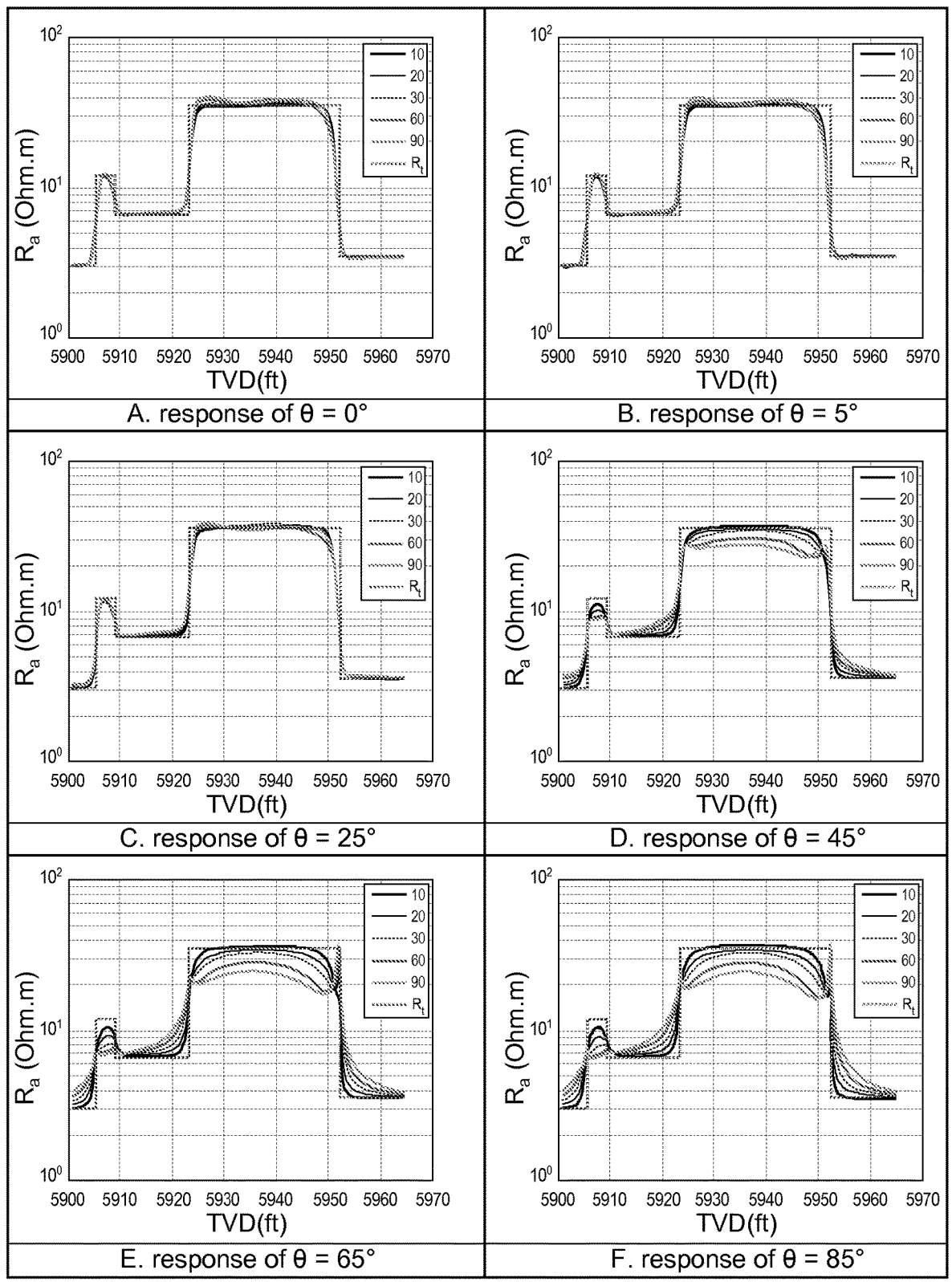
FIGS. 5A-5F illustrate the total relative dips effect in an example five-layer formation with differing relative dip angles.

FIGS. 5A-5F illustrates the total relative dips effect (e.g., type I and II relative dip effects) for induction processed two ft. resolution curves in a five-layer formation with differing relative dip angles. In the examples of FIGS. 5A-5F, actual impedance $R_a$ at the following depths of investigation (in inches) are displayed: 10, 20, 30, 60 and 90. $R_t$ represents the formation resistivity. As the relative dip angle grows, the total relative dip effect also grows, which is represented by curve separation. Where dip is present, the data should be dip corrected. Dip corrected results (e.g., induction logs where raw data has been corrected for dip, as illustrated in FIG. 5A) have separation of curves that is similar to the zero degree relative dip. The automated relative dip correction algorithm previously described is capable of taking a known relative dip (e.g., such as the 45 degrees in FIG. 5D) and correcting the data to what the logging tool would read if there was zero dip (e.g., as shown in FIG. 5A, which represents zero dip or relative dip corrected data).

Figure 6:
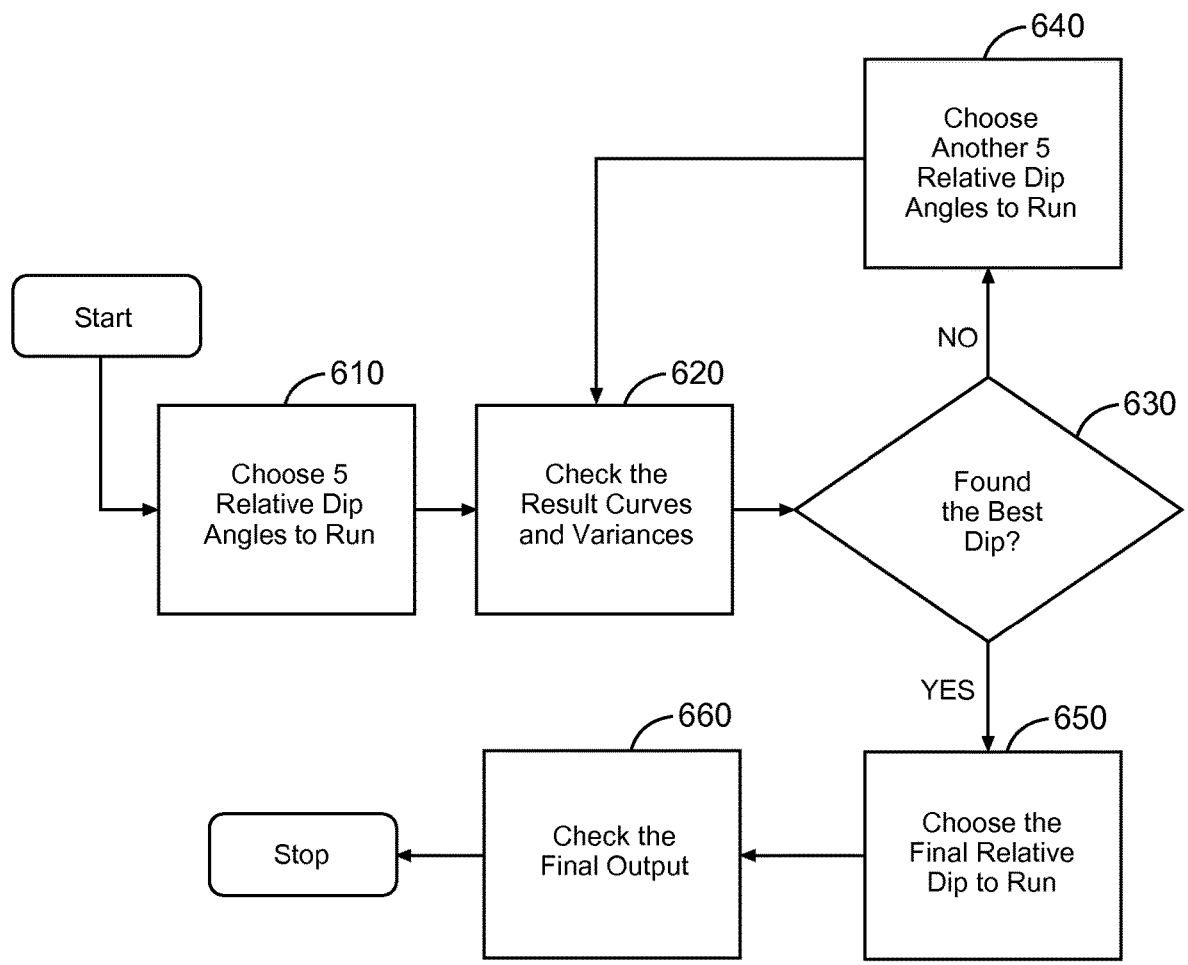
FIG. 6 illustrates a flow diagram of an example method for interpretation of relative dip angles.

Quality assurance of dip corrected results may be improved using further interpretation of data that has been dip corrected utilizing automated relative dip correction algorithms. Array induction data that has been dip corrected is displayed and compared for a range of relative dip angles. In an embodiment, raw data is provided as input into an automated relative dip correction algorithm. FIG. 6 illustrates a flow diagram of an example method for relative dip correction. In step 610, a first set of relative dip angles is selected by the user to perform automated relative dip correction. In a different embodiment, the first set of relative dip angles is provided by the automated relative dip correction algorithm and includes a range of angles between 0° and 90°. In this example, the user selects five different angles that are separated by a first interval, wherein the difference between the five different angles are incrementally increased by the first interval amount. For example, for a starting relative dip angle of 5° and the first interval being 20°, the first set of relative dip angles comprises: 5°, 25°, 45°, 65°, and 85°. Automated relative dip correction is performed on the raw data with the first set of relative dip angles.

Figure 7:
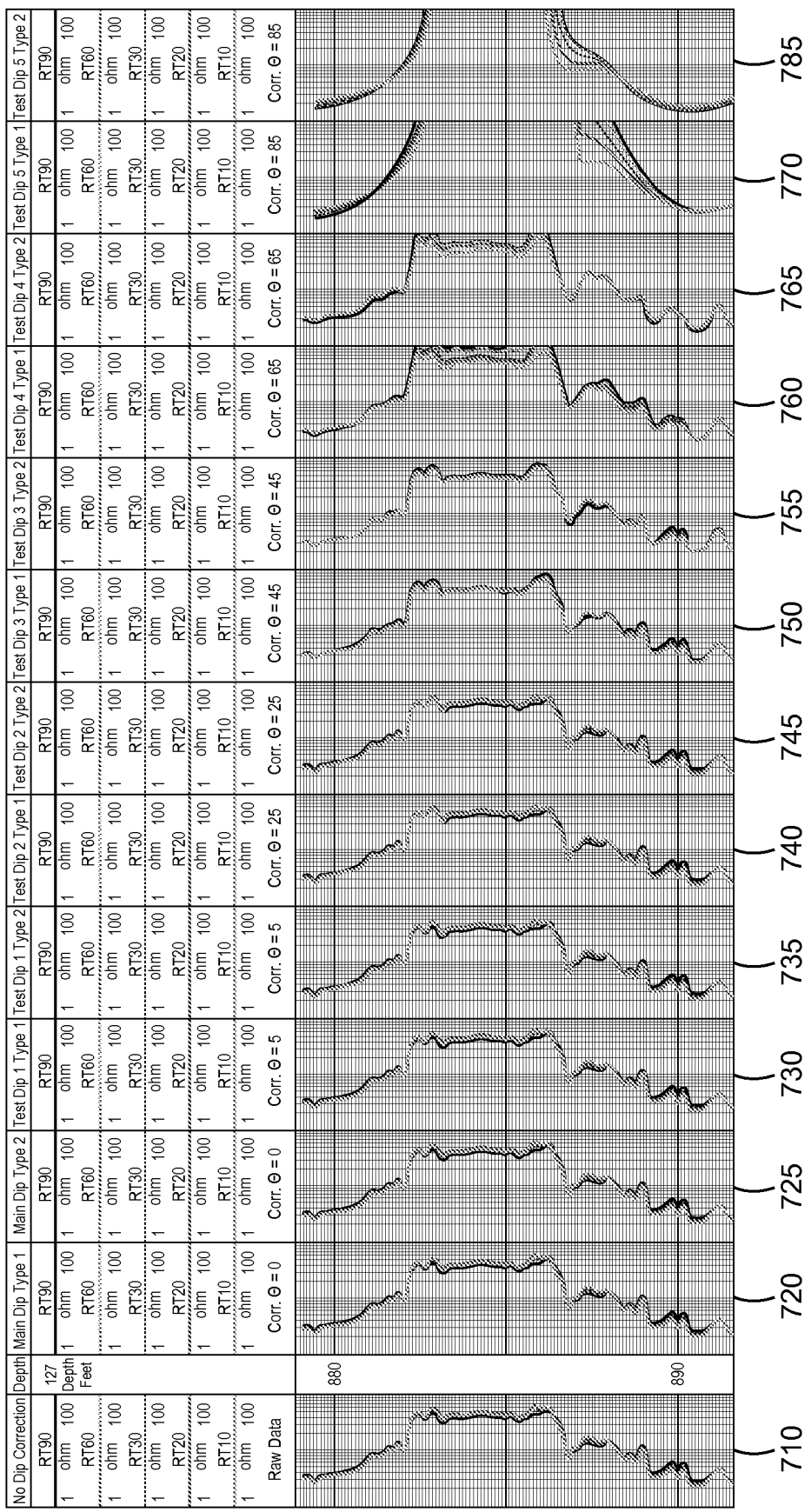
FIGS. 7-8 illustrate example outputs from the automated relative dip correction algorithm.

An example output from the automated relative dip correction algorithm is illustrated in FIG. 7. Raw field data representing array induction data that has not been dip corrected is provided in track 710. Type I relative effect dip corrected data for a relative dip angle of 0° is provided in track 720. Type I and Type II relative effect (e.g., total relative dip effect) dip corrected data for a relative dip angle of 0° is provided in track 725. Type I relative effect dip corrected data for the starting relative dip angle of 5° is provided in track 730. Type I and Type II effect (e.g., total relative dip effect) dip corrected data for the starting relative dip angle of 5° is provided in track 735. Continuing with the first interval of 20° relative dip angle increments, tracks 740 through 775 represent Type I effect dip corrected data and total relative dip effect corrected data for the first set of relative dip angles. The resistivity curves for various depths of investigation are displayed, wherein the curves displayed in tracks 710 through 785 are resistivity curves (e.g., RT90, RT60, RT30, RT20, RT10) for their respective focal depths.

Referring back to FIG. 6, in step 620, the user analyzes the resulting resistivity curves and variances (e.g., curve separation) between curves to determine if the best relative dip angle has been determined. The effect of dip creates curve separation between the resistivity curves. In the example of FIG. 7, the resistivity curves suggest to the user that relative dip correction proximate to the 45° relative dip angle should be further examined. The resistivity curve at 45° relative dip angle suggests that some automated correction was performed relative to the 0° raw data, but not too large of a correction such that smoothing of the data occurs (e.g., tracks 770 and 785 for relative dip angles of 85°). However, the user cannot determine that the best relative dip angle has been found due to a relatively large interval of 20° between the first set of relative dip angles. Therefore, at step 630, the method continues to step 640.

In step 640, a second set of relative dip angles is selected by the user to perform automated relative dip correction. In this example, the user selects five different angles that are separated by a second interval, wherein the difference between the five different angles are incrementally separated by the second interval amount. For example, for a second starting relative dip angle of 45° (e.g., due to steps 620 and 630 indicating that angles proximate to the relative dip angle of 45° should be further examined), the five different angles should be both lower and higher than 45° to properly examine angles proximate to the second starting relative dip angle. In this example, with the second starting relative dip angle being 45° and the second interval being 5°, the second set of relative dip angles comprises: 35°, 40°, 45°, 55°, and 60°. In a different embodiment, the second set of relative dip angles is provided by the automated relative dip correction algorithm and includes a plurality of angles surrounding the second starting relative dip angle. Automated relative dip correction is performed again on the raw data with the second set of relative dip angles.

Figure 8:
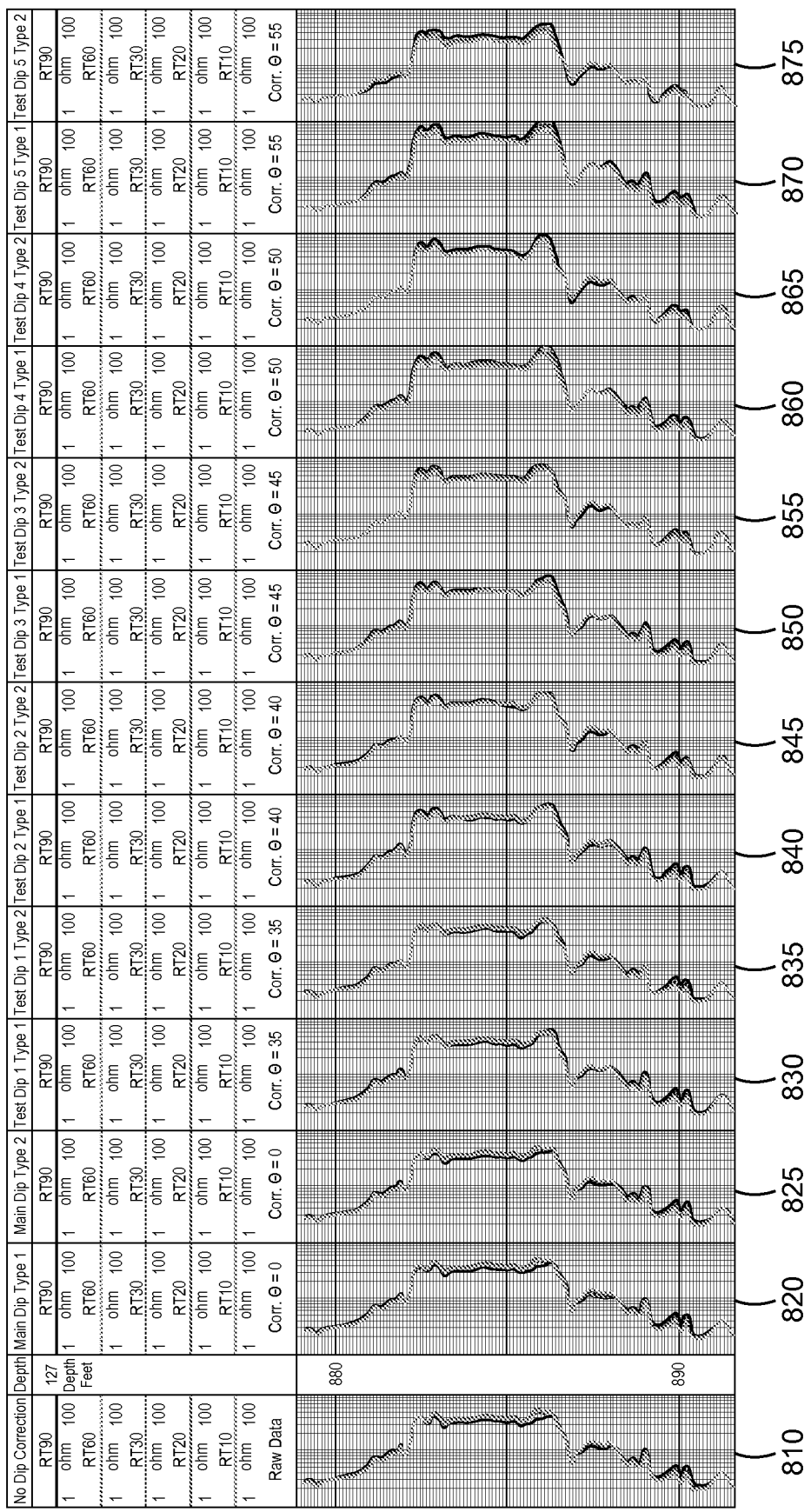

An example output from the automated relative dip correction algorithm using the second set of relative dip angles is illustrated in FIG. 8. Raw field data representing array induction data that has not been dip corrected is provided in track 810. Type I effect dip corrected data for a relative dip angle of 0° is provided in track 820. Type I and Type II effect (e.g., total relative dip effect) dip corrected data for a relative dip angle of 0° is provided in track 825. Type I effect dip corrected data for the second starting relative dip angle of 45° is provided in track 850. Type I and Type II effect (e.g., total relative dip effect) dip corrected data for the second starting relative dip angle of 45° is provided in track 855. Tracks 830 through 875 represent Type I effect dip corrected data and total relative dip effect corrected data for the second set of relative dip angles. It is observable that separation between the resistivity curves decreases from tracks 830 and 835 (representing relative dip angles of 35°) to tracks 840 through 855 (representing relative dip angles of 40° and 45°). It is further observable that separation between the resistivity curves increases as relative dip angles are increased from tracks 840 through 855. Thus, this suggests that the relative dip angle is interpreted to be somewhere in the range of 40° to 45°.

Referring back again to FIG. 6, the steps of 620 through 640 may be performed any number of times with smaller increments between relative dip angles if the user desires to interpret for relative dip angles with increasing resolution. However, for the purposes of this application, the process is only described above as only being performed once (e.g., moving from a degree accuracy of 20° to 5°). After a final relative dip angle with sufficient accuracy has been interpreted, the user may proceed to step 650 of selecting the final relative dip angle to perform automated relative dip correction with. Subsequently, at step 660, relative dip corrected data for the determined final relative dip angle is output.

One of ordinary skill in the art will understand that although described herein in the context of performing the automated relative dip correction algorithm with five different relative dip angles (which are separated equally by a relative dip angle increment) for each batch, the automated relative dip correction may be performed with any number of angles during each batched processing. Further, the user may set the relative dip angle increments to be any angle and the increment does not have to be equal from one relative dip angle to the next. For example, in one alternative embodiment, step 620 may be performed with nine different test relative dip angles, ranging from 5° to 85° with 10° increments. In a different alternative embodiment, in step 620, the user can arbitrarily select a number of different test relative dip angles (e.g., 5°, 8°, 21°, 45°, and 85°).

Figure 9:
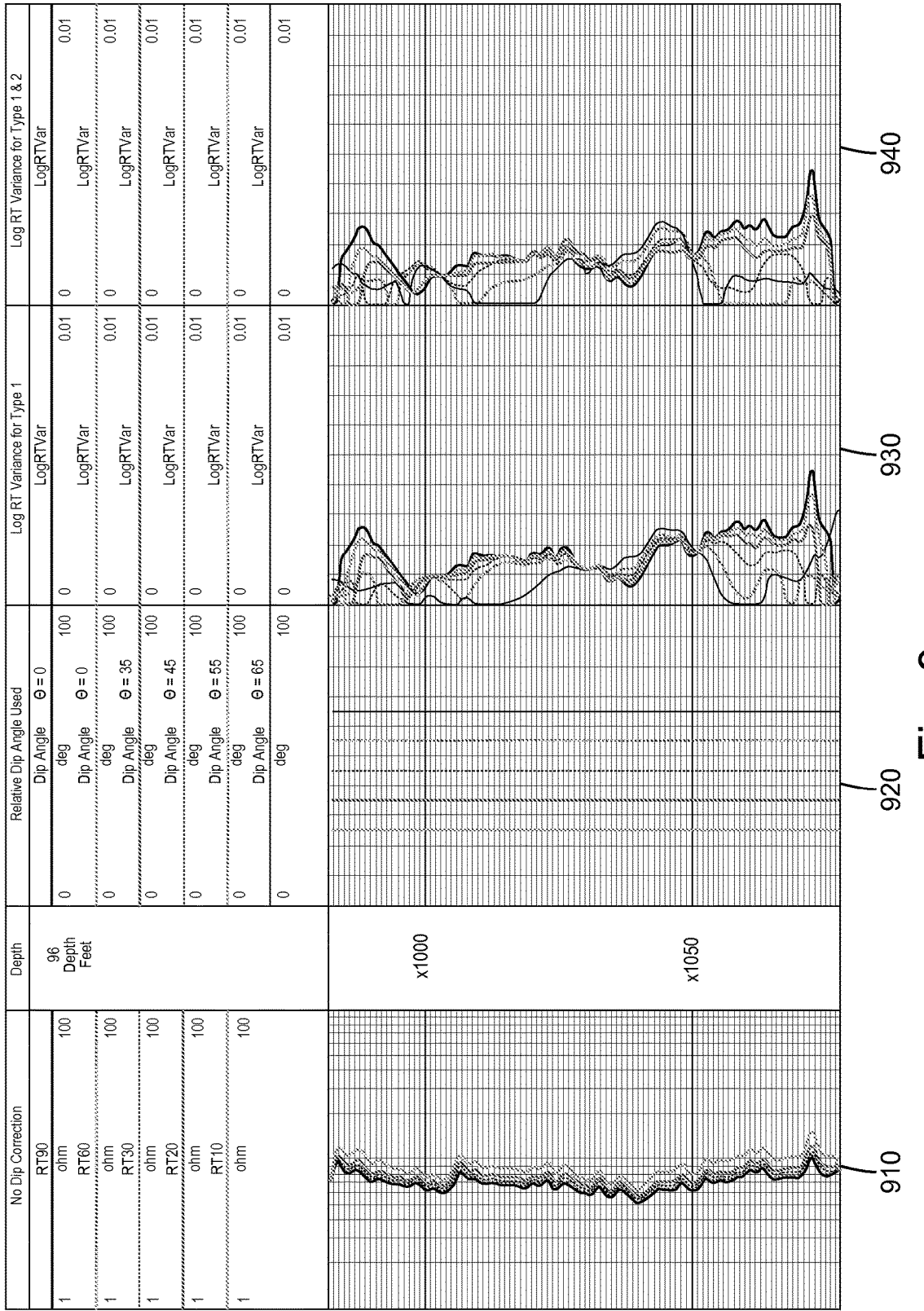
FIG. 9 illustrates an example indicator of the quality of relative dip angle corrections.

In an embodiment, the present disclosure includes indicators of the quality of relative dip angle correction (referred to as "LogRTVar"), as illustrated in FIG. 9. Track 910 displays raw, uncorrected induction data for a plurality of resistivity curves at various depths of investigation are displayed. Track 920 displays the relative dip angles used for dip correction. In this example, the user has specified a start relative dip angle of 25° and a test relative dip increment of 10°. Therefore, relative dip corrected data at 25°, 35°, 45°, 55°, and 65° relative dip angles will be output. Track 920 can be used by the user to help recall the values of the input relative dip angles.

Tracks 930 and 940 LogRTVar for type I and total relative dip (type I and type II) corrections for the various input relative dip angles. LogRTVar is the average of all logarithm pairwise difference squared for the RT90, RT60, RT30, RT20 and RT10 curves. LogRTVar, when viewed over many depths, is a qualitative indicator of the relative dip correction, particularly when there is no invasion, and is used to assist in the interpretation of optimal values for the relative dip correction.

In another embodiment, in formations with thick beds, LogRTVar is assumed to be a constant value, even with invasion (assuming invasion properties do not vary significantly). Correcting measured data to LogRTVar in thick beds allows for interpretation of the correct relative dip angle.

In FIG. 9, the resistivity curves associated with input relative dip angles of 55° and 65° have too much variance, which suggests that relative dip corrections at 55° and 65° are too large. The correct relative dip correction lies between the resistivity curves associated with input relative dip angles between 35° and 45°. Similar to the embodiment of FIGS. 6-8, after determining an initial range for the correct relative dip correction, the process may be repeated any number of times with increasing resolution and accuracy (e.g., performing relative dip corrections of 35, 37.5, 40, 42.5 and 45 degrees) to interpret the appropriate relative dip correction.

Figure 10:
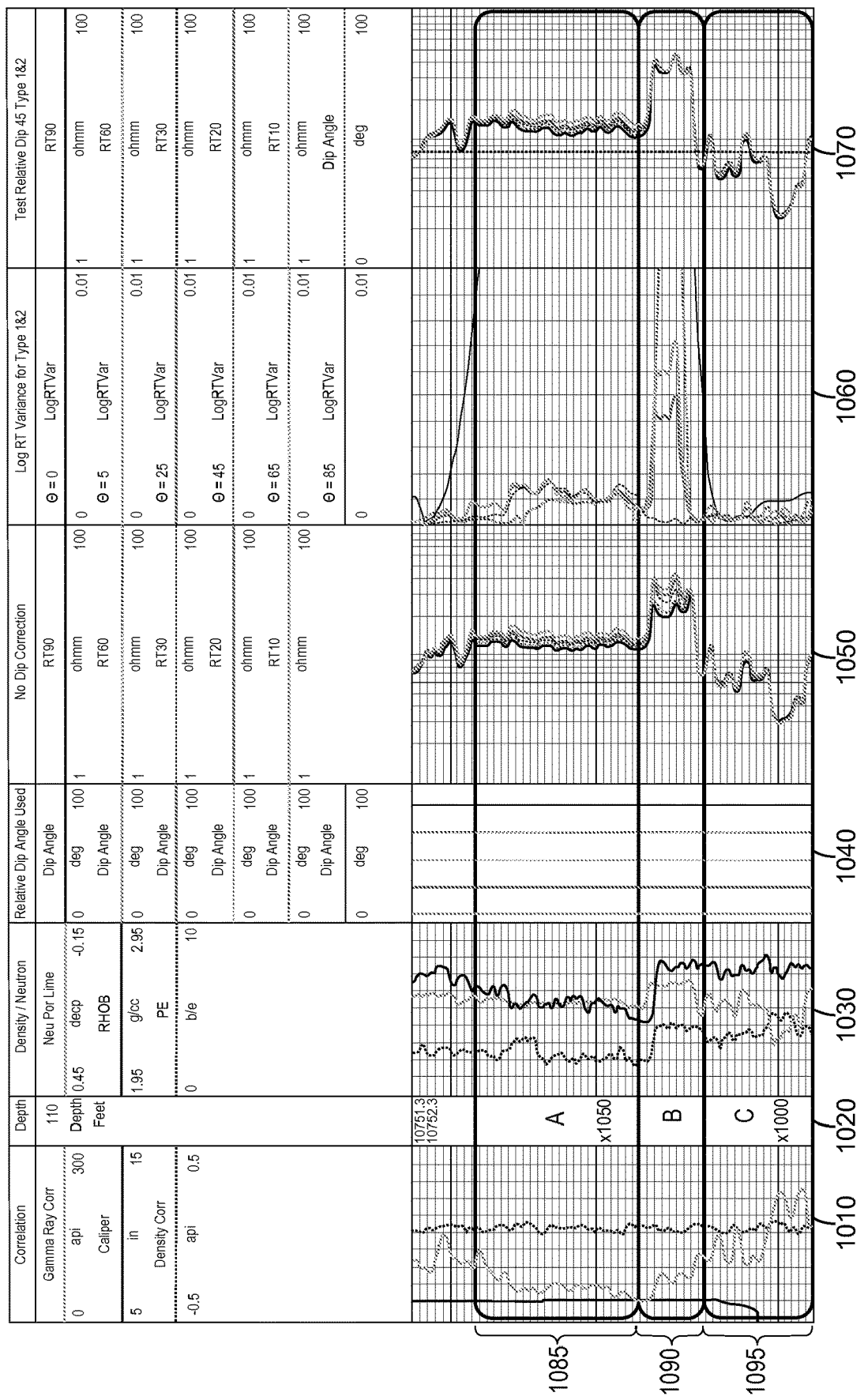
FIG. 10 illustrates another embodiment of relative angle interpretation in zones of interest.

FIG. 10 illustrates another embodiment utilizing relative dip correction and invasion in zones of interest. Track 1010 displays curves representing the correlation curves, gamma ray, density correction and caliper. Track 1020 displays the depth of measurement in units of feet. Track 1030 displays measured neutron, density and photoelectric effects. Track 1040 displays the relative dip angles used in the relative dip correction model.

Zone A 1085 is interpreted by the user to be a clean sandstone, as indicated by the low gamma ray counts in track 1010. The curves in track 1010 further show that the borehole caliper is engaged and density correction is small demonstrating good pad contact with the density tool. Further, track 1030 indicates that zone A 1085 is a sandstone with a PE value of approximately 2.0 (the ideal value is 1.8 for a clean zone), and that the density and neutron porosity equates to approximately 9 PU of porosity. Zone B 1090 is interpreted by the user to be a tight streak with porosity of approximately 0 PU and having high resistivity. A tight streak or impermeable zone, like zone B 1090, should not demonstrate an invasion profile as seen in track 1050. Therefore, the data in track 1050 indicates the presence of relative dip effects. Zone C 1095 is interpreted by the user to be a dirty sandstone above and shale below with porosity of approximately 0 PU.

Track 1050 displays resistivity curves for data with no relative dip correction applied (e.g., the originally measured data/raw field resistivity data). Track 1060 displays the LogRTVar for total relative dip effects at the six different relative dip angles used. Track 1070 displays the resistivity curves for RT90, RT60, RT30, RT20 and RT10 curves for a relative dip angle at 45°.

In this example, analysis of the various tracks shows high variance behavior for the LogRTVar curves at 65° and 85°. Based upon curve variances, the 45° relative dip effect correction curves appear to be more accurate than the other angles used, especially when compared to the curves at 65° and 85° that show unstable LogRTVar responses. This is confirmed in track 1070, which demonstrates the relative dip correction at 45° for the entire interval and does not exhibit large separation in the curves. Further, in the shale section of zone C 1095, the original resistivity curves in track 1050 (with no relative dip correction applied) is approximately equivalent to the curves displayed in track 1070, which is the correct response in shale formations and further validates the relative dip of 45° and resistivity response.

Though described serially in the examples of FIGS. 6-10, one of ordinary skill in the art would recognize that other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a workstation, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
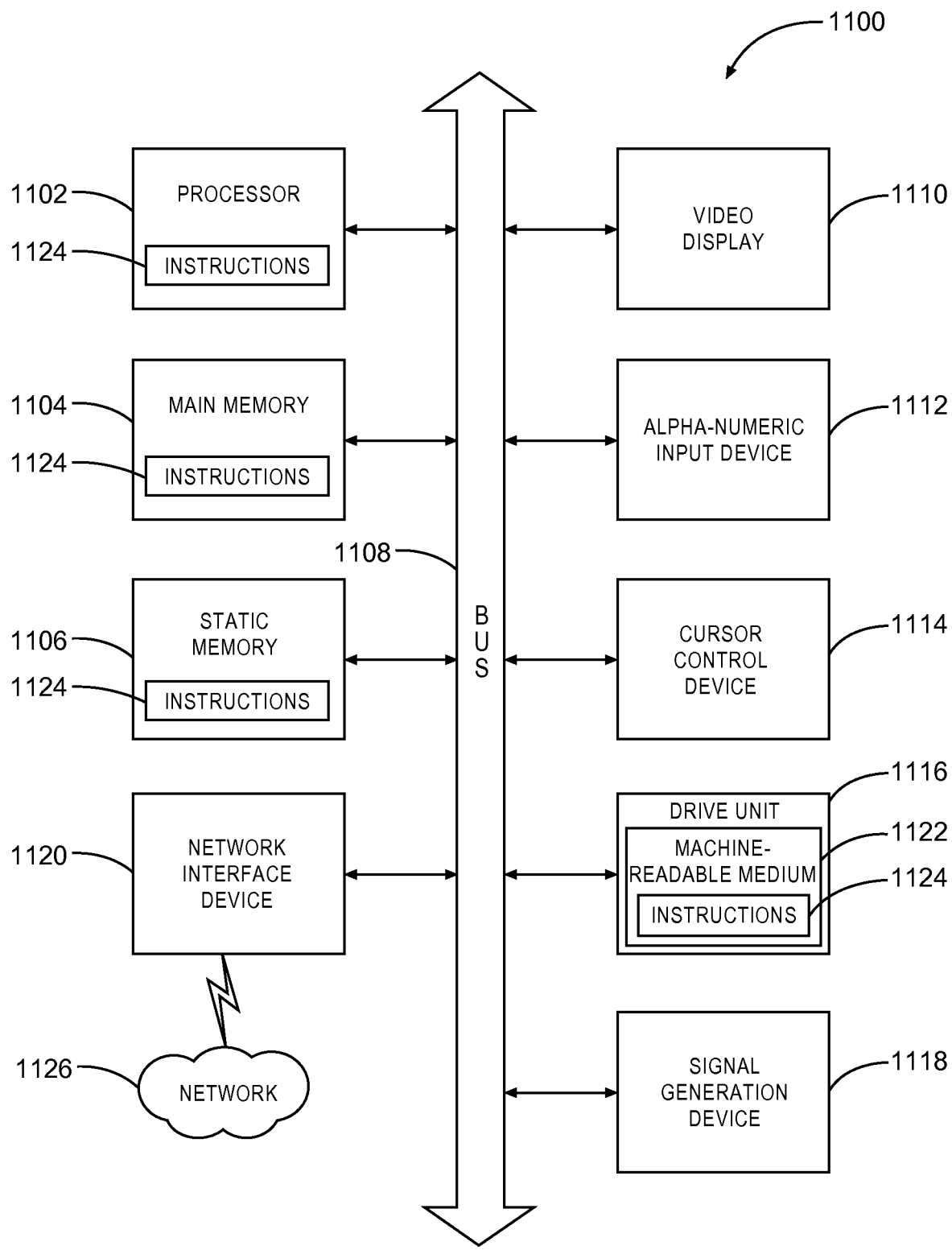
FIG. 11 is a diagrammatic representation of a machine in the example form of a computer system within which a set of instructions for causing the machine to perform any one or more of the methodologies discussed herein may be executed.

FIG. 11 is a block diagram of machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

Machine-Readable Medium and Machine Readable Storage Medium

The disk drive unit 1116 includes a machine-readable medium 1122 on which is stored one or more sets of instructions and data structures (e.g., software) 1124 embodying or used by any one or more of the methodologies or functions described herein. The instructions 1124 may also reside, completely or at least partially, within the main memory 1104, static memory 1106, and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing or encoding data structures used by or associated with such instructions. The term "machine-readable storage medium"

shall accordingly be taken to include, but not be limited to, solid-state memories, and optical and magnetic media. Specific examples of machine-readable storage media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks. All such machine readable storage media are hardware devices suitable for storing data and/or instructions for a suitable period of time to enable use by the machine, and are therefore non-transitory.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   collecting, using a logging tool within a borehole, induced electromagnetic signal data for at least two frequencies and at least two different borehole depths;
   correcting relative dip effect for the electromagnetic signal data using a first set of two or more relative dip angles, including,
      generating a first formation model based on each of the first set of two or more relative dip angles;
      generating a second formation model based on a reference relative dip angle;
      determining a dip factor as a function of the first and second formation models; and
      applying the dip factor to the electromagnetic signal data to generate a first plurality of dip effect corrected resistivity curves;
   selecting a second set of relative dip angles based on variances within the first plurality of dip effect corrected resistivity curves; and
   correcting relative dip effect for the electromagnetic signal data using the second set of relative dip angles.

2. The method of claim 1, further comprising selecting the first set of relative dip angles including selecting a first starting relative dip angle, a number of relative dip angles, and a first relative dip angle increment.

3. The method of claim 1, wherein said correcting relative dip effect for the electromagnetic signal data using the second set of relative dip angles includes:
   generating a first formation model based on each of the selected first set of relative dip angles;
   generating a second formation model based on a reference relative dip angle;
   determining a dip factor as a function of the first and second formation models; and
   applying the dip factor to the electromagnetic signal data to generate a second plurality of dip effect corrected resistivity curves.

4. The method of claim 3, wherein the second set of relative dip angles is in a narrower angular range than and within the first set of relative dip angles.

5. The method of claim 3, wherein said selecting the second set of relative dip angles comprises:
   selecting a starting relative dip angle within an angular range of the first set of relative dip angles; and
   selecting a second relative dip angle increment that is less than the first relative dip angle increment.

6. The method of claim 1, further comprising selecting the first set of relative dip angles including receiving user selection of a plurality of test relative dip angles.

7. The method of claim 3, further comprising:
   comparing separations between the first plurality of dip effect corrected resistivity curves to determine a separation variance; and
   selecting a range of the second set of dip angles based, at least in part, on the determined separation variance.

8. The method of claim 1, further comprising:
   generating a quality indicator for the relative dip angle correction.

9. A system comprising:
   a logging tool disposed with a borehole and configured to collect induced electromagnetic signal data for at least two frequencies and at least two borehole depths;
   one or more computers including one or more processors and one or more storage devices storing instructions that are operable, when executed by the one or more processor, to cause the one or more computers to perform operations comprising:
      collecting, using a logging tool within a borehole, induced electromagnetic signal data for at least two frequencies;
      correcting relative dip effect for the electromagnetic signal data using a first set of two or more relative dip angles, wherein said correcting includes,
         generating a first formation model based on each of the first set of two or more relative dip angles;
         generating a second formation model based on a reference relative dip angle;
         determining a dip factor as a function of the first and second formation models; and
         applying the dip factor to the electromagnetic signal data to generate a first plurality of dip effect corrected resistivity curves;

selecting a second set of relative dip angles based on variances within the first plurality of dip effect corrected resistivity curves; and correcting relative dip effect for the electromagnetic signal data using the second set of relative dip angles.

10. The system of claim 9, wherein the instructions further comprise instructions that cause the operations of selecting the first set of relative dip angles including selecting a first starting relative dip angle, a number of relative dip angles, and a first relative dip angle increment.

11. The system of claim 7, wherein said selecting a range of the second set of relative dip angles includes:

selecting a starting relative dip angle that substantially coincides with an angle at which the separation variance occurs; and selecting a second relative dip angle increment that is less than the first relative dip angle increment.

12. The system of claim 9, wherein said correcting relative dip effect for the electromagnetic signal data using the second set of relative dip angles includes:

generating a first formation model based on each of the selected first set of relative dip angles;

generating a second formation model based on a reference relative dip angle;

determining a dip factor as a function of the first and second formation models; and applying the dip factor to the electromagnetic signal data to generate a second plurality of dip effect corrected resistivity curves.

13. The system of claim 12, wherein the second set of relative dip angles is in a narrower angular range than and within the first set of relative dip angles.

14. The system of claim 12, wherein said selecting the second set of relative dip angles comprises:

selecting a starting relative dip angle within an angular range of the first set of relative dip angles; and selecting a second relative dip angle increment that is less than the first relative dip angle increment.

15. The system of claim 9, further comprising selecting the first set of relative dip angles including receiving user selection of a plurality of test relative dip angles.

16. The system of claim 12, further comprising:

comparing separations between the first plurality of dip effect corrected resistivity curves to determine a separation variance; and selecting a range of the second set of dip angles based, at least in part, on the determined separation variance.

17. The system of claim 16, wherein said selecting a range of the second set of relative dip angles includes:

selecting a starting relative dip angle that substantially coincides with an angle at which the separation variance occurs; and selecting a second relative dip angle increment that is less than the first relative dip angle increment.

18. The system of claim 9, further comprising:

generating a quality indicator for the relative dip angle correction.

* * * * *